April 27, 1937.  J. C. TRUEMPER  2,078,473
BUSHING MATERIAL
Filed March 20, 1936

INVENTOR.
John C. Truemper
BY
Hood + Hahn.
ATTORNEYS.

Patented Apr. 27, 1937

2,078,473

UNITED STATES PATENT OFFICE 2,078,473

BUSHING MATERIAL

John C. Truemper, Indianapolis, Ind.

Application March 20, 1936, Serial No. 69,893

6 Claims. (Cl. 85—2.4)

My invention relates to improvements in bushing material for use in bushing openings or holes into which screws and the like are to be inserted.

In attaching screws to such material as cement work, brick work and the like, it is customary to first drill a hole of the required size into the brick work or cement work, or the like, and then insert the screw, using a bushing of some character to form a wedge.

In such types of devices as have been heretofore used in the commercial art, great difficulty has been experienced in providing a bushing device which will insure the holding of the screw and at the same time prevent the splitting of the material upon the insertion of the screw.

Furthermore, such devices as have been produced in the commercial art have been relatively expensive, have required the workman to carry with him various sized devices to accommodate various sized openings, and have not had the capability of gripping the walls of the openings with sufficient friction to prevent the screw from being pulled out.

It is one of the objects of my invention to provide a bushing material which may be carried by the workman in the form of strips or sheets, which may be formed by the workman on the job, to the required size, which will readily expand in the opening in close contact with the walls of the opening and which will be sufficiently soft to have formed therein by the insertion of the screw, screw threads.

For the purpose of disclosing my invention, I have illustrated certain embodiments thereof in the accompanying drawing, in which.

In the preferred embodiment of my invention, the strip of material is formed of sheet lead, preferably in substantially its virgin condition. This sheet is scored at 1 and 2 on its opposite faces, the scores or grooves being opposite one another, to provide elongated relatively narrow strips 3 connected at their edges by a fragile joint, the strip being formed of a material of comparatively high tension strength which is substantially devoid of elasticity while being, to a certain extent, flexible. In use, a portion of the material of the desired length is broken off along the scored line and is then rolled into cylindrical shape, leaving, due to the strip-like formation of the material, a comparatively small opening at its center, and the roll being sufficiently large to substantially fill the opening into which the screw is to be inserted. After the roll has been inserted into the opening, the screw is started in the center opening and driven in the usual manner into the roll. Due to the wedge shape of the screw and the expanding effect of this screw, as it enters the roll, the roll itself will be expanded radially, tending to separate the strips, one from the other, at their fragile joint, and at the same time, the metal being comparatively soft, the screw will cut its own threads into the metal. Due to the fact that the material is flexible lengthwise and due to the fact that the edges of the material are connected together by a fragile joint, the joints of the strips will break, permitting the strips to radially expand and the flexibility of the strips will cause them to adapt themselves to the longitudinal irregularities of the opening so that by the time the screw is driven home, a tight wedge bushing is provided securely holding the screw in position.

If it is desired to increase the longitudinal flexibility of the strips, they may be transversely scored as at 4 on one or both sides.

While I have described my invention as being preferably formed of sheet lead, the invention may be formed of other material such, for instance, as fiber. In such case, the strips 5 may be separately formed and then secured, by gluing or otherwise, upon a flexible backing 6 of fabric or the like, which is sufficiently fragile to permit the tearing off of a suitable number of strips for the desired opening and the breaking apart radially of the strips in the manner heretofore described. These strips 5 may likewise, if desired, be transversely scored to increase their flexibility.

Figure 6:
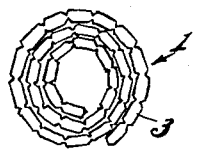
Fig. 6 is an end view of my material rolled to form a bushing.
Figure 7:
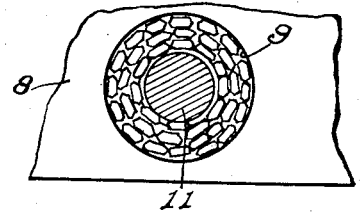
Fig. 7 is a detail end view showing material inserted in position and a screw driven therein.

In Fig. 6, I have illustrated the cylindrical form which the strips will take when rolled up into the form of a bushing, and in Fig. 7 I have illustrated the manner in which the bushing will expand and fill out the opening when the screw is driven home. In this figure, the brick 8 has had a hole 9 drilled therein and the cylinder, illustrated in Fig. 6, inserted. With the insertion or driving of the screw 11, it will be noted that the strips 3 have broken at their joints so that they completely fill the opening in a wedging position.

Figure 5:
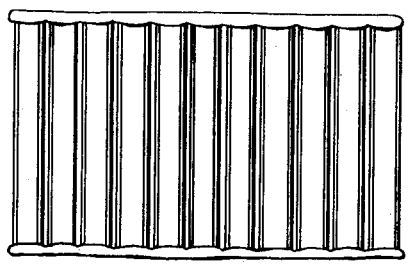
Fig. 5 is a plan view of a still further modification of my invention.

In Fig. 5, I have illustrated still another form which my strip may take. In this form the strips may be of a described metal such, for instance, as tin or other metal which are connected together by dipping the ends into a bath of solder glue, thereby forming a fragile joint at the ends of the strips so that any number of strips may be detached from the main body and the strips then rolled and inserted in the opening will separate in the manner heretofore described with respect to the other modifications of the invention.

Figure 1:
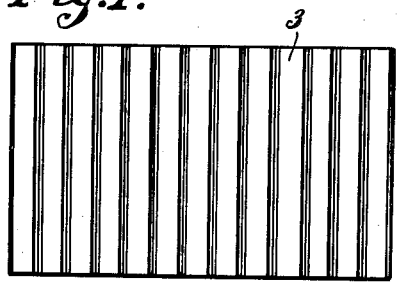
Fig. 1 is a plan of a strip of material embodying my invention.
Figure 3:
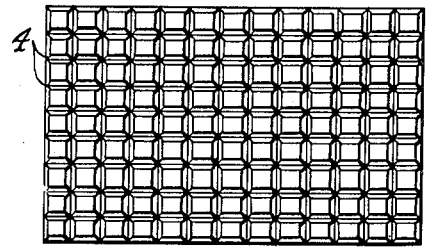
Fig. 3 is a plan of a modified form of the structure illustrated in Figs. 1 and 2.
Figure 2:
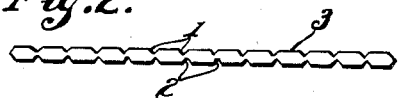
Fig. 2 is an end view thereof.
Figure 4:
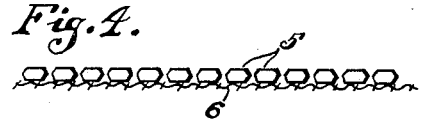
Fig. 4 is an end view of a further modification of my invention.
Figure 8:
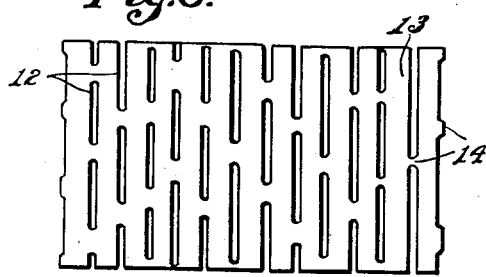
Fig. 8 is a plan view of a still further modification of my invention.

In Fig. 8 I have illustrated a still further modification of my invention, wherein the sheet of material instead of being scored as illustrated in Fig. 1 has a series of elongated slots punched therein at regularly spaced intervals. These slots 12 may be staggered as illustrated in this figure. However, even in this structure, it will be noted that due to the slots the edges of the strips as at 13 are connected by fragile portions 14 so that the strips will break apart in substantially the same manner as illustrated in Fig. 7 and so that the strips can be separated to obtain the desired length to be rolled up.

I claim as my invention:

1. A bushing for openings adapted to receive a wedging member such as a screw comprising a web of relatively narrow elongated strips of flexible material of relatively high tensile strength and substantially void of elasticity, fragilely held together at their edges and rolled upon itself into a multilayer roll having a center opening considerably smaller in diameter than the diameter of the wedging member for insertion into the opening to be bushed, said strips being adapted to radially separate upon the insertion of the wedging member into the rolled cylinder.

2. A bushing for openings adapted to receive a wedging member such as a screw comprising a web of relatively narrow elongated strips of flexible material of relatively high tensile strength and substantially void of elasticity and transversely grooved along the length thereof and rolled into a multilayer roll having a center opening considerably smaller in diameter than the diameter of the wedging member for insertion into the opening to be bushed, said strips being adapted to radially separate upon the insertion of the wedging member into the roll.

3. A bushing for openings adapted to receive a wedging member such as a screw comprising a sheet of flexible material of relatively high tensile strength and substantially devoid of elasticity grooved on its back and front faces, the grooves being opposite one another to form elongated strips of material connected together by a fragile portion and rolled into a multilayer roll having a center opening considerably smaller in diameter than the diameter of the wedging member for insertion into the opening to be bushed, said strips being adapted to radially separate along said grooves upon the insertion of the wedging member into the roll.

4. A bushing for openings adapted to receive a wedging member such as a screw comprising a strip of flexible material of relatively high tensile strength and substantially devoid of elasticity grooved on its front and back, the grooves being opposite one another to form elongated strips connected together by a fragile portion and said strips being transversely grooved to increase longitudinal flexibility thereof, and rolled into a multilayer roll having a center opening considerably smaller in diameter than the diameter of the wedging member for insertion into the opening to be bushed, said strips being radially separable along the line of the longitudinal groove upon the insertion of the wedging member into the roll.

5. A bushing for openings adapted to receive a wedging member such as a screw comprising a sheet of lead grooved on its opposite faces at opposite points to form a series of narrow elongated strips of lead connected together by a fragile joint and rolled into a multilayer roll having a center opening considerably smaller in diameter than the diameter of the wedging member for insertion into the opening to be bushed, said strips being adapted to readily separate along the line of the fragile joint upon the insertion of the wedging member into the roll.

6. A bushing for openings adapted to receive a wedging member such as a screw comprising a sheet of lead grooved on its opposite faces at opposite points to provide a series of narrow elongated strips of lead connected together by a fragile joint, said strips being transversely grooved to increase their longitudinal flexibility and rolled into a multilayer roll having a center considerably smaller in diameter than the diameter of the wedging member for insertion into the opening to be bushed, said strips being adapted to radially separate at their fragile joints upon the insertion of the wedging member into the roll.

JOHN C. TRUEMPER.